Patented Aug. 12, 1952

2,606,816

UNITED STATES PATENT OFFICE 2,606,816

PROCESS FOR PRODUCING HIGHLY ACTIVE MAGNESIA FROM MAGNESIUM HYDROXIDE

Albert C. Zettlemoyer and William C. Walker, Bethlehem, Pa., and Walter J. Riley, Westfield, N. J., assignors to Food Machinery and Chemical Corporation, New York, N. Y., a corporation of Delaware No Drawing. Application December 9, 1948, Serial No. 64,433

14 Claims. (Cl. 23—201)

This invention relates to active magnesias and to the production of such compounds by an improved method of burning or calcining magnesium hydroxide obtained particularly by precipitation from sea water or sea water bittern.

It has been reported by prior workers in this field that when magnesium hydroxide is heated at temperatures below about 350° C., no dissociation or loss of water occurs, that at temperatures of 350° to 425° C. dehydration occurs at a non-commercial slow rate to provide active magnesia of iodine values up to 112 and that at still higher temperatures up to about 800° C., dehydration very rapidly occurs and magnesias are producible having intermediate iodine values, and in one instance up to as high as 180. The highly active magnesias produced at these temperatures by heating only a few minutes in an internally fired kiln are unavoidably non-uniform in character as to their activity both from particle to particle and from the outside surface to the center of each particle. Magnesias of higher iodine value also have heretofore been produced from magnesium carbonate, but the processes whereby such products are obtained do not lead to comparable products when applied to magnesium hydroxide as the starting material.

An object of the invention is to produce more uniform active magnesias from magnesium hydroxide by commercially satisfactory processes at reasonable temperatures and time periods in readily available equipment. Another object is to produce more highly active magnesias from magnesium hydroxide than those heretofore producible. Another object is to provide active magnesias from magnesium hydroxide precipitated from sea water or sea water bittern which source is practically inexhaustible in contrast with the known limited supply of magnesite ore from which magnesia has heretofore been produced in substantial quantities.

In its main embodiment the process of the invention involves the production of active magnesias from magnesium hydroxide by burning the said hydroxide at a temperature of about 310° to 400° C. while passing a substantially dry gas through or in contact therewith at a rate of at least 50 cu. ft./hr./kg. of the hydroxide treated.

The minimum employable rate in any specific adaptation of the process depends somewhat upon the temperature used, the kiln employed, the method by which the hydroxide treated has been produced and the particle size of the hydroxide used.

A magnesium hydroxide very satisfactorily employed as the initial material is one produced by the process of the M. G. Mastin Patent Number 2,124,002 involving precipitation by reaction with lime, the more insoluble magnesium hydroxide from bitterns remaining after sodium chloride has been separated from sea water by solar evaporation. The precipitated magnesium hydroxide is then washed in order to reduce substantially the chloride content. It is then dried, as for example in the rotary kiln or other suitable furnace and then ground to a size not larger than sixty mesh. The washing is carried out in such manner as to reduce the chloride content below 1% and preferably below about 0.4%. Although the substantially complete removal of impurities greatly assists in obtaining the most highly active magnesias, it may not be practical economically to effect further purification than the lower percentage indicated.

The size to which the dried magnesium hydroxide is ground, below sixty mesh, does not affect to any substantial extent the activity of the ultimate burned product obtained, although for practical reasons, the particles should not be so small as to permit their entrainment in the gas stream and removal from the kiln during the subsequently employed heat treatment described below.

In a most satisfactory burning or calcining operation contemplated by the present invention, a substantially dry ground, purified magnesium hydroxide from the source indicated, is contacted in a freely flowing loose mass with an adequate stream of dry or substantially dry air or other inert non-inflammable gas. This contact is very effectively obtained in accordance with a specific feature of the present invention in an externally heated rotary kiln preferably having longitudinal fins therein, in which the magnesium compound is continuously turned and tumbled or lifted and dropped thereby facilitating contact of the introduced gas with the solid particles.

In the treatment of the finely ground magnesium hydroxide practical benefit from the use of the dry gas is not obtained unless it is employed in substantial volume in relation to the amount of the hydroxide being passed in contact therewith. Hence under the ordinary conditions of operation the amount must be at the stated minimum of about 50 cu. ft./hr./kg. of the magnesium hydroxide. Increased benefits are obtained by using greater rates of flow. When amounts up to 150 cu. ft./hr./kg. are employed, the improvement is noticeable, but when the rate is increased from said figure to 300 cu. ft./hr./kg., the increase in activity obtainable is very surprisingly enhanced by as much as 28%. Products of highest iodine number are obtained when the atmosphere in the kiln is at a water vapor pressure not greater than that indicated by one millimeter of mercury. Magnesias of high activity may be obtained, however, with water vapor pressures as high as five millimeters of mercury.

The process of the invention is capable of producing magnesias of any desired degree of activity and of ignition losses of about 5 to 12 per cent. These magnesias, being produced from the hydroxide, are substantially free of combined carbon dioxide and they differ in this respect from magnesias derived by the burning of magnesite or magnesium carbonate. By proper control of the process as herein described, magnesias can be produced having very high activities indicated by tests showing iodine numbers of from 185 up to about 300, which numbers are higher than those possessed by any magnesias heretofore produced from the hydroxide.

In obtaining magnesias of very high iodine numbers, it is essential that the rate of dehydration be high in the first stages of the operation, and the higher the rate, the higher the iodine number. The water vapor concentration becomes less critical as the treatment progresses. It has now been discovered that this initially high dehydration rate can be very effectively accomplished by passing the magnesium hydroxide and the dry air or other inert gas concurrently into a rotary kiln whereby the initial contact of the magnesium hydroxide is with the air or gas when the latter is in its dryest state. Accordingly one of the specific embodiments of the process involves this concurrent passage of the air or gas and the magnesium hydroxide through a rotary kiln or other heating zone.

The iodine numbers of the products of the present invention are an indication of the degree of activity and are also roughly equal to the surface area in square meters per gram measured by nitrogen adsorption. Such numbers referred to herein were determined by a process which is a slight modification of the usual industrial method, the modified method being employed to obtain a larger spread in readings. The improved method is described in an article by two of the present applicants, Zettlemoyer and Walker, in Industrial Engineering Chemistry, volume 39, page 69, of January 1947.

*Example 1*

A lime-precipitated magnesium hydroxide from sea water bittern was washed until the sodium chloride content was reduced to 0.3%. After being dried, this material of minus 80 mesh size was introduced into a rotary kiln externally heated and slowly rotated. Hot, substantially dry air was introduced into and passed through the kiln at a rate of 100 cu. ft./hr./kg. of magnesium hydroxide. With the aid of external heating, the temperature within the kiln was maintained at 330° C. In a period of seven hours the magnesium hydroxide was found to have reached its maximum iodine number, the same being 204. The ignition loss of the sample was 11%.

*Example 2*

In each of a series of runs, a washed and ground lime-precipitated magnesium hydroxide containing 0.3% sodium chloride was introduced into a rotary kiln wherein the same was heated to a temperature of 350° C. Hot, substantially dry air was introduced into and passed through the kiln at the rates set forth in the table below with the results indicated therein. In each case, samples were withdrawn periodically in order that the product of the maximum iodine number could be obtained.

| Run | Air-Charge Ratio Cu. ft./hr./kg. | Iodine Number | Time, hrs. | Percent Ignition Loss |
|---|---|---|---|---|
| A | 0 | 131 | 14.5 | 6.0 |
| B | 50 | 201 | 4 | 7.1 |
| C | 110 | 203 | 4 | 6.7 |
| D | 150 | 209 | 3 | 5.4 |
| E | 300 | 269 | 3 | 9.0 |

It will be observed from the foregoing table that when no air was passed in contact with the charge, the maximum iodine number was 131, that the iodine number was substantially increased when air was introduced at the rate of 50 cu. ft./hr./kg., that no substantial further increase was obtained when the ratio was increased to 150 cu. ft. and that a very substantial additional increase was obtained when this ratio was increased to 300 cu. ft./hr./kg.

*Example 3*

The process of Example 1 was carried out with the change that instead of introducing the air at a ratio of 100 it was introduced at the ratio of 300 cu. ft./hr./kg. Through this procedure a product was obtained having an iodine number at the very high figure of 278. This product was obtained in 6.25 hours with an ignition loss of 7.6%.

*Example 4*

A run of the process was made similar to run D of Example 2, the only change being that the air used, before the same was preheated and introduced into the kiln, was first passed through a dry ice trap wherein it was more completely dried and was also deprived of part of its carbon dioxide content. As a result, the iodine number of the product was increased from 209 to 234, the process taking four hours and the ignition loss being 5.7%.

*Example 5*

A run paralleling run C of Example 2 was carried out using magnesium hydroxide prepared by reacting magnesium with dry methyl alcohol and then hydrolyzing the metholate formed. Upon burning this very pure material, a magnesia product having the extremely high iodine number of 285 and an ignition loss of 7.5% was obtained.

In view of established necessity in prior art processes of using high temperatures to obtain magnesias of high iodine number, it is surprising that the relatively low temperatures of 330° and 350° C. of the above examples illustrating the instant process produce magnesias of even higher activity. Furthermore, under the prior processes, it was found that increases in the burning temperatures employed from 350° C. up to several hundred degrees higher resulted in products of progressively higher activity, whereas under the present procedure, it was determined that decreases in the temperatures used from 400° C. down to 350° C. or less resulted in products of increasing activity. The dry air treatment appears to be the primary factor making these low temperatures so effective.

This dry air treatment of magnesium hydroxide, however, is advantageous for producing uniform active magnesia in an acceptably short period of time at temperatures above those hereinbefore described, the heat being supplied wholly or for the most part by indirect heat transfer, and furthermore is advantageous at rates of dry air introduction less than the herein described and preferably employed minimum rate of 50 cu. ft./hr./kg. of hydroxide treated. As an example of a process in which the dry air, indirect heat treatment at higher temperatures than 400° C. may be employed, there may be mentioned a procedure in which the magnesium hydroxide to be burned is dropped rapidly through an indirectly heated hot zone in contact with a stream of substantially dry air or other gas. In its broadest scope the present invention, therefore, includes burning magnesium hydroxide to magnesia by indirect heat transfer while passing a substantially dry gas in contact with the hydroxide.

The magnesias of the present invention are of general utility where active magnesias have heretofore been employed and are useful in a number of additional fields due to their increased activities and uniform quality. They may be employed as absorbents and as adsorbents for purifying or altering fluids, as support for catalysts and as catalysts themselves. Their utility lies not only in many fields where known magnesias are useful but also lies in a number of additional fields where higher activities and different properties come into play.

It should be understood that the present invention is not limited to the specific details set forth herein except where otherwise indicated herein and that it extends to all equivalents which will occur to those skilled in the art upon consideration of the scope of the claims appended hereto.

We claim:

1. A process for producing highly active magnesias from magnesium hydroxide which comprises, burning magnesium hydroxide at a temperature of about 310° to 400° C. while passing in contact therewith a substantially dry gas inert to magnesia having a water vapor pressure not in excess of that indicated by 5 mm. of mercury at a rate of at least 50 cu. ft./hr./kg. of the hydroxide treated until such magnesia is produced.

2. A process for producing highly active magnesias from magnesium hydroxide which comprises, burning magnesium hydroxide at a temperature of about 310° to 400° C. while passing in contact therewith a substantially dry gas inert to magnesia having a water vapor pressure not in excess of that indicated by 5 mm. of mercury at a rate of at least 150 cu. ft./hr./kg. of the hydroxide treated.

3. A process for producing highly active magnesias from magnesium hydroxide which comprises, burning magnesium hydroxide at a temperature of about 330° to 350° C. while passing in contact therewith a substantially dry gas inert to magnesia having a water vapor pressure not in excess of that indicated by 5 mm. of mercury at a rate of at least 150 cu. ft./hr./kg. of the hydroxide treated.

4. A process for producing highly active magnesias from magnesium hydroxide precipitated by means of lime from sea water bittern which comprises, washing the said magnesium hydroxide to substantially reduce the chloride content thereof, burning the thus purified magnesium hydroxide at a temperature of about 310° to 400° C. while passing therethrough substantially dry air having a water vapor pressure not in excess of that indicated by 5 mm. of mercury at a rate in excess of 50 cu. ft./hr./kg. of magnesium hydroxide treated.

5. A process for producing highly active magnesias from magnesium hydroxide precipitated by means of lime from sea water bittern which comprises, washing the said magnesium hydroxide to substantially reduce the chloride content thereof, burning the thus purified magnesium hydroxide at a temperature of about 310° to 400° C. while passing therethrough substantially dry air having a water vapor pressure not in excess of that indicated by 5 mm. of mercury at a rate in excess of 150 cu. ft./hr./kg. of magnesium hydroxide treated.

6. A process for producing highly active magnesias from magnesium hydroxide which comprises, burning magnesium hydroxide at a temperature of about 310° to 400° C. while passing a substantially dry gas inert to magnesia having a water vapor pressure not in excess of that indicated by 5 mm. of mercury at a rate in excess of 50 cu. ft./hr./kg. of magnesium hydroxide treated through the magnesium hydroxide while the same is in a freely flowing loose mass.

7. A process for producing highly active magnesias from magnesium hydroxide which comprises, burning magnesium hydroxide at a temperature of about 310° to 400° C. while passing a substantially dry gas inert to magnesia having a water vapor pressure not in excess of that indicated by 5 mm. of mercury at a rate in excess of 150 cu. ft./hr./kg. of magnesium hydroxide treated through the magnesium hydroxide while the same is in a freely flowing loose mass.

8. A process for producing highly active magnesias from magnesium hydroxide which comprises, burning substantially pure magnesium hydroxide at a temperature of from about 310° to 400° C. in a current of substantially dry air having a water vapor pressure not in excess of that indicated by 5 mm. of mercury passed therethrough at a rate in excess of 50 cu. ft./hr./kg. of magnesium hydroxide treated.

9. A process for producing highly active magnesias from magnesium hydroxide which comprises, introducing substantially dry and pure magnesium hydroxide into and through a heating zone in contact with a stream of substantially dry gas inert to magnesia having a water vapor pressure not in excess of that indicated by 5 mm. of mercury flowing at a rate of not less than about 50 cu. ft./hr./kg. of magnesium hydroxide treated wherein the said hydroxide is heated to a temperature of from about 310° to 400° C.

10. A process for producing highly active magnesias which comprises, introducing substantially dry magnesium hydroxide into and through a heating zone in contact with a stream of dry gas inert to magnesia having a water vapor pressure not in excess of that indicated by 5 mm. of mercury flowing at a rate of not less than about 50 cu. ft./hr./kg. of magnesium hydroxide treated and in said zone, periodically suspending the magnesium hydroxide material in the flowing gas while the magnesium hydroxide is being heated at least in part by indirect heat transfer from the zone walls to a temperature of 310° to 400° C.

11. A process for producing highly active magnesias from magnesium hydroxide which comprises, introducing magnesium hydroxide and a substantially dry gas inert to magnesia having a water vapor pressure not in excess of that indicated by 5 mm. of mercury at a rate of at least 50 cu. ft./hr./kg. of the hydroxide treated into a heating zone, passing the resulting mixture concurrently through said zone, maintaining said mixture in said zone at a temperature of about 310° to 400° C. until a highly active magnesia is obtained.

12. A process for producing highly active magnesias which comprises, introducing substantially dry magnesium hydroxide into and through a heating zone in contact with a flowing stream of dry gas inert to magnesia at a rate of not less than about 50 cu. ft./hr./kg. of magnesium hydroxide treated and in said zone, maintaining a water vapor pressure in said zone at a level not greater than that indicated by one millimeter of mercury, heating the said hydroxide while in said zone to a temperature of about 310° to 400° C. until a highly active magnesia is obtained.

13. A process for producing highly active magnesias having iodine numbers of at least 185 which comprises, passing a voluminous stream of a substantially dry gas inert to magnesia at a rate of not less than about 50 cu. ft./hr./kg. of magnesium hydroxide treated through a heating zone in intimate contact with finely divided magnesium hydroxide maintained at a temperature of about 310° to 400° C., maintaining a water vapor pressure in said zone during said heating at a level not greater than that indicated by one millimeter of mercury and discontinuing the treatment when a magnesia product is obtained having an iodine number of at least 185.

14. A process for producing active magnesias from magnesium hydroxide which comprises, burning magnesium hydroxide at a temperature of about 310° C. to 400° C. by heat supplied through the walls of the kiln in which the burning is effected while passing through said kiln in contact with the magnesium hydroxide a dry gas inert to magnesia having a water vapor pressure not in excess of that indicated by 5 mm. of mercury at a rate of not less than about 50 cu. ft./hr./kg. of magnesium hydroxide treated.

ALBERT C. ZETTLEMOYER.
WILLIAM C. WALKER.
WALTER J. RILEY.

REFERENCES CITED

The following references are of record in the file of this patent:

UNITED STATES PATENTS

| Number | Name | Date |
|---|---|---|
| 2,219,726 | Seaton | Oct. 29, 1940 |
| 2,234,367 | Chesny | Mar. 11, 1941 |
| 2,281,477 | Chesny | Apr. 28, 1942 |

FOREIGN PATENTS

| Number | Country | Date |
|---|---|---|
| 549,492 | Great Britain | Nov. 24, 1942 |